(12) United States Patent
Dvorak et al.

(10) Patent No.: US 7,707,829 B2
(45) Date of Patent: May 4, 2010

(54) FLUSHING SYSTEM HAVING A SINGLE CHARGE RELIEF VALVE

(75) Inventors: Paul Anthony Dvorak, Sanford, NC (US); Matthew Chad Full, Siler City, NC (US); Paul Alan Rousseau, Raleigh, NC (US)

(73) Assignee: Caterpillar S.A.R.L., Geneva (CH)

( * ) Notice: Subject to any disclaimer, the term of this patent is extended or adjusted under 35 U.S.C. 154(b) by 264 days.

(21) Appl. No.: 11/896,957

(22) Filed: Sep. 7, 2007

(65) Prior Publication Data

US 2009/0064675 A1    Mar. 12, 2009

(51) Int. Cl.
*F16D 31/02* (2006.01)
(52) U.S. Cl. .................................... 60/464
(58) Field of Classification Search ............. 60/464, 60/484, 486, 488
See application file for complete search history.

(56) References Cited

U.S. PATENT DOCUMENTS

| | | |
|---|---|---|
| 3,279,172 A | 10/1966 | Kudo et al. |
| 4,324,098 A | 4/1982 | Aruga et al. |
| 4,332,134 A | 6/1982 | Cochran et al. |
| 4,369,625 A | 1/1983 | Izumi et al. |
| 4,376,371 A | 3/1983 | Kojima et al. |
| 4,845,948 A | 7/1989 | Tha et al. |
| 6,109,031 A | 8/2000 | Katagiri et al. |
| 6,352,035 B1 | 3/2002 | Kashiwase et al. |
| 6,633,804 B2 | 10/2003 | Dix et al. |
| 6,739,127 B2 | 5/2004 | Nippert et al. |
| 6,772,591 B2 | 8/2004 | Ohashi et al. |
| 7,185,577 B2 | 3/2007 | Ohashi et al. |
| 2006/0218913 A1 | 10/2006 | Ivantysynova et al. |

OTHER PUBLICATIONS

Flushing Valve and Operating Charge Relief Valve Operation, 700J Crawler Dozer Manual, dated Jan. 31, 2005.

*Primary Examiner*—Michael Leslie
(74) *Attorney, Agent, or Firm*—Finnegan, Henderson, Farabow, Garrett & Dunner

(57) ABSTRACT

A flushing system for a transmission is disclosed. The system has a first pump and a first actuator connected to the first pump to form a first loop. The system also has a second pump and a second actuator connected to the second pump to form a second loop. The system further has a charge pump configured to replenish the first and second loops. The system also has a single charge relief valve situated to receive fluid from the first pump, the second pump, and the charge pump.

14 Claims, 3 Drawing Sheets

FLUSHING SYSTEM HAVING A SINGLE CHARGE RELIEF VALVE

TECHNICAL FIELD

This disclosure is directed to a flushing system for a closed hydrostatic loop and, more particularly, to a flushing system having a single charge relief valve.

BACKGROUND

Machines, including skidsteer loaders, track-type tractors, hydraulic tracked excavators, military tanks, and other similar types of heavy construction and mining equipment are used for a variety of tasks. These machines typically include ratio control devices that transmit torque from an engine to one or more traction devices that move the machine. These ratio control devices generally include a hydrostatic transmission having a common pump and two motors independently driven by pressurized fluid from the pump, or two completely separate pump and motor combinations.

Two independent motors are required for steering of the machine. That is, during a steering event, one or more driven traction devices located on one side of the machine may be caused to rotate at a slower speed than or in a direction opposite to one or more driven traction devices located on an opposing side of the machine to cause the machine to turn. Without independent driving rotations of the traction devices, these types of machine would not be steerable.

Temperature differentials (or hot spots) inherently occur in hydrostatic transmissions because of differences in fluid pressure across the transmission. Flushing the entire charge flow of a closed hydrostatic loop can reduce these hot spots. With full charge flushing, the entire flow of a closed hydrostatic loop discharges into a storage tank. Simultaneously, the system pumps in cooler replacement fluid. In larger vehicles, providing multiple charge relief valves (i.e., one or more relief valves for each pump/motor pairing) presents a cost-effective way to attain full charge flushing of a closed hydrostatic loop.

Although perhaps effective for large vehicles, in smaller vehicles, such as a skidsteer loader, providing multiple charge relief valves can be cost prohibitive. One low cost alternative for flushing a closed hydrostatic loop is disclosed in U.S. Pat. No. 4,332,134 (the '134 patent) issued to Cochran et al. on Jun. 1, 1982. The '134 patent discloses a bleed valve for a closed loop hydrostatic transmission system having a charging line, a low pressure loop line, a high pressure loop line, and a low pressure drain line. In order to keep the hydrostatic power transmission loop lines cool, a controlled bleed can be implemented. During the controlled bleed, fluid discharges through the bleed valve at a low rate to a tank or other low pressure drain as the lost oil is simultaneously replaced by cool charging oil. The bleed valve includes a pressure sensing port, a poppet means, and a means for balancing pressure-forces applied to the poppet means. When charging pressure in the closed hydrostatic loop becomes low, the balancing means and poppet means cooperate to shut off the bleed valve. Because the system of the '134 patent can provide flushing with a single valve, it may be a low cost alternative to providing multiple valves.

Although the system of the '134 patent may provide a low cost solution to cooling a hydrostatic transmission, it may provide insufficient cooling. That is, the cooling flow may be interrupted when the pressure of the circuit is too low (i.e. the system does not provide full flow flushing). This interruption may result in periods of undesired high temperatures.

The flushing system of the present disclosure solves one or more of the problems set forth above.

SUMMARY OF THE DISCLOSURE

In one aspect, the present disclosure is directed to a flushing system for a transmission. The system includes a first pump and a first actuator connected to the first pump to form a first loop. The system also includes a second pump and a second actuator connected to the second pump to form a second loop. The system further includes a charge pump configured to replenish the first and second loops. The system also includes a single charge relief valve situated to receive fluid from the first pump, the second pump, and the charge pump.

In another aspect, the present disclosure is directed toward a method for flushing a transmission. The method includes pressurizing fluid at a first location, pressurizing fluid at a second location, and pressurizing fluid at a third location. The method also includes directing fluid from the third location to the first and second locations. The method further includes directing fluid pressurized from the first, second, and third locations to a tank during a driving condition and only from the third location to the tank during a neutral condition.

DETAILED DESCRIPTION

Figure 1:
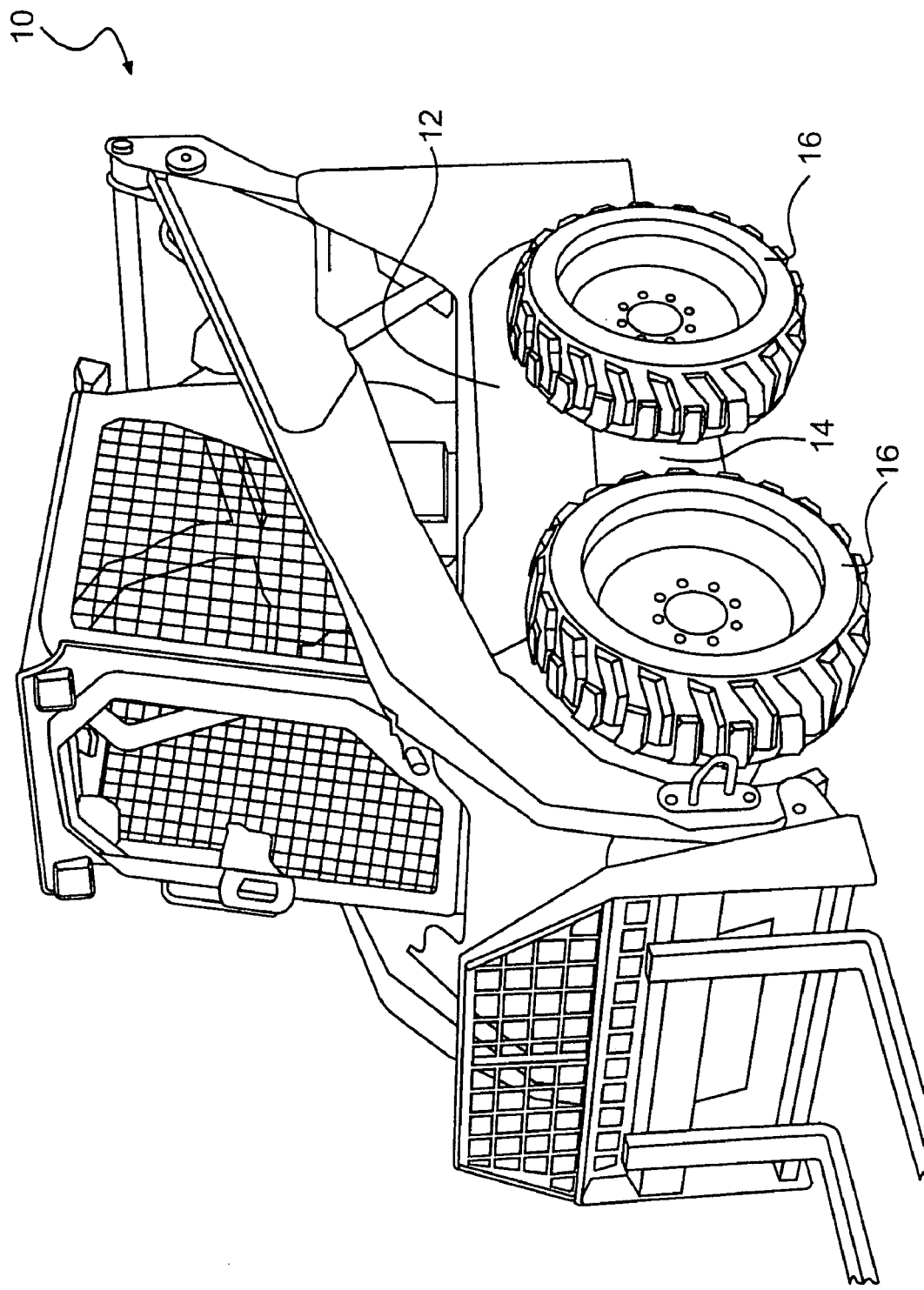
FIG. 1 is a pictorial illustration of an exemplary disclosed machine.

FIG. 1 illustrates an exemplary disclosed machine 10 having a plurality of components that cooperate to perform some type of task associated with an industry such as mining, construction, agriculture, transportation, or any other industry. While machine 10 is illustrated as a skidsteer loader, machine 10 may alternatively embody any type of mobile machine having one or more systems operable to perform a particular function. For example, machine 10 may include an on-highway vehicle, an off-highway vehicle, a wheel loader, an excavator, a military tank, or any other type of machine. Machine 10 may include, among other things, a power source 12, one or more traction devices 16, and a transmission 14. Power source 12 may be connected to drive traction devices 16 via transmission 14.

Power source 12 may produce a mechanical power output and embody an internal combustion engine such as, for example, a diesel engine, a gasoline engine, a gaseous fuel-powered engine, or any other type of engine apparent to one skilled in the art. Power source 12 may, alternatively, embody a non-combustion source of power such as a battery, a fuel cell, a motor, or any other suitable source of power.

Traction devices 16 may include wheels located on either side of machine 10 and driven by power source 12 to affect the propulsion and yaw of machine 10. Traction devices 16 may include one or more driven components, e.g., an axle or a sprocket; one or more non-driven components, e.g., a guide wheel or a hub; and/or additional components known in the art. The driven components may be operatively connected to power source 12 via transmission 14 to receive mechanical power therefrom and provide movement to traction devices 16, thereby propelling machine 10. It is contemplated that traction devices 16 may additionally or alternatively include tracks, belts, or other traction devices in any appropriate number.

Figure 2:
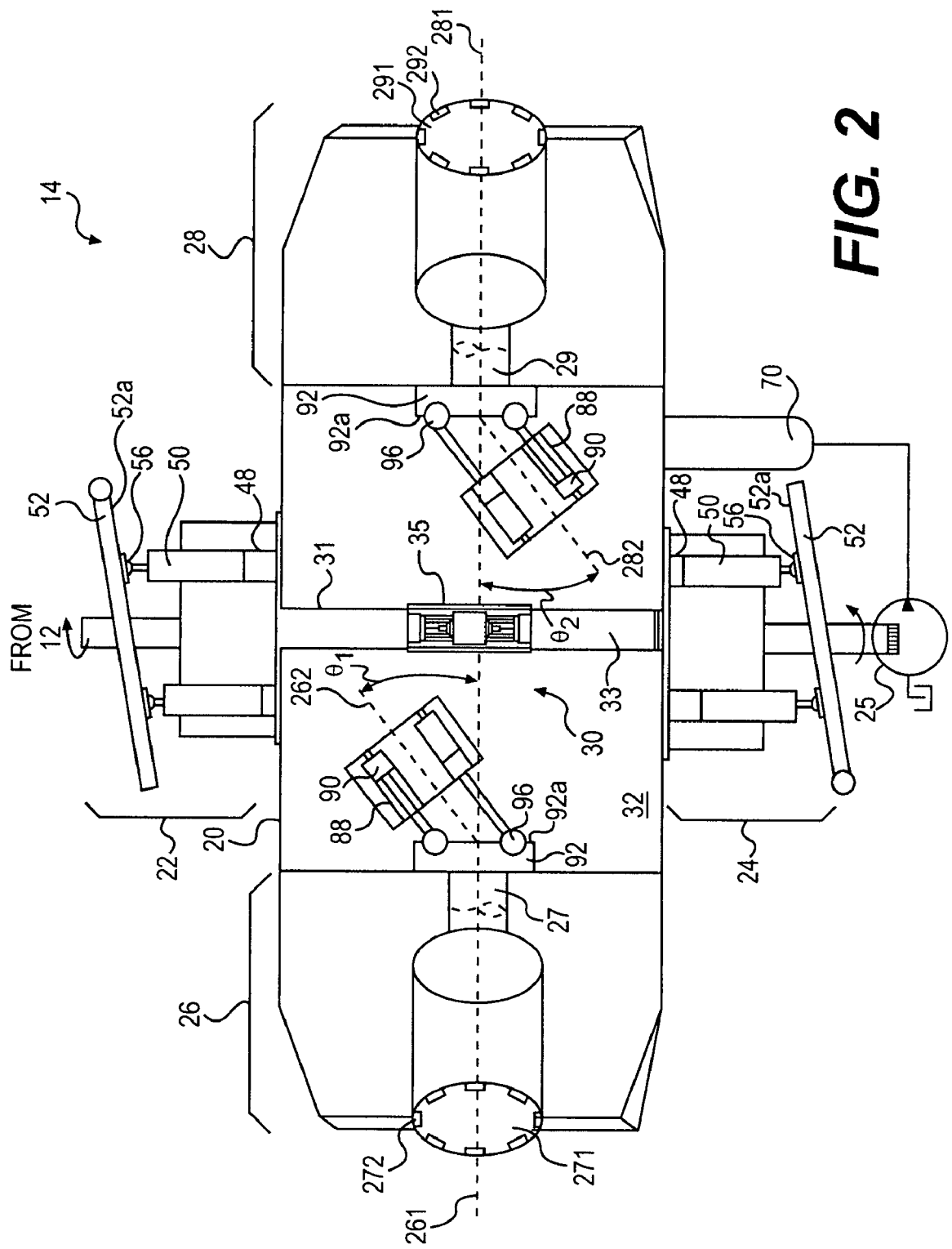
FIG. 2 is a diagrammatic and schematic illustration of an exemplary disclosed transmission for use with the machine of FIG. 1.

As illustrated in FIG. 2, transmission 14 may include components that cooperate to efficiently transmit energy from power source 12 to traction devices 16. Transmission 14 may include a first hydraulic pump 22, a second hydraulic pump 24, and a charge pump 25. Second hydraulic pump 24 may be arranged in axial alignment with first hydraulic pump 22. Transmission 14 may further include a driveshaft assembly 30 extending completely through at least one of the first and second main hydraulic pumps 22 and 24 to receive a torque input from power source 12. Transmission 14 may further include a first motor 26 fluidly connected to and driven by the first main hydraulic pump 22, and a second motor 28 fluidly connected to and driven by the second main hydraulic pump 24.

First main hydraulic pump 22 may be a swashplate-type pump and include multiple piston bores 48 and pistons 50 held against a tiltable and rotatable swashplate 52. One piston 50 may be slidably disposed within each of the bores 48. The swashplate 52 may have a driving surface 52a, and each piston 50 may be biased into engagement with the driving surface 52a. A joint 56, such as, for example, a ball and socket joint, may be disposed between each piston and swashplate 52 to allow for relative movement between the swashplate 52 and each piston 50. The pistons 50 may reciprocate within the piston bores 48 to produce a pumping action as the swashplate 52 is rotated. The driveshaft assembly 30 may be connected to the swashplate 52 and driven by power source 12. The swashplate 52 of the first hydraulic pump 22 may be tilted relative to a longitudinal axis of the driveshaft assembly 30 to vary a displacement of pistons 50 relative to bores 48. Alternatively, first hydraulic pump 22 may be a piston-type pump, an impeller-type pump, or any other suitable type of pump known in the art. First hydraulic pump may be an over-center type pump, as further explained below in relation to FIG. 3.

When driveshaft assembly 30 is rotated by power source 12, the angled driving surface 52a of the swashplate 52 may drive each piston 50 through a reciprocating motion within each bore 48. When piston 50 is retracting from bore 48, fluid may be allowed to enter bore 48. When piston 50 is moving into bore 48 under the force of driving surface 52a, piston 50 may force the fluid from bore 48 and toward first motor 26. Second hydraulic pump 24 may be substantially similar to first hydraulic pump 22 and be connected to driveshaft assembly 30 in axial alignment with first hydraulic pump 22. This axial alignment may allow both first hydraulic pump 22 and second hydraulic pump 24 to receive a single torque input from power source 12 via driveshaft assembly 30. Alternatively, first hydraulic pump 22 and second hydraulic pump 24 may be driven separately from power source 12, and/or independently of each other.

First motor 26 may be a fixed or variable displacement, bent-axis type motor fluidly coupled to a housing 20. First motor 26 may include a driving rotational axis 261 (output) and a driven rotational axis 262 (input) angled relative to the driving rotational axis 261 by an angle of, for example, $\theta_1$. As described above, first motor 26 may receive pressurized fluid from first hydraulic pump 22 causing first motor 26 to rotate. Alternatively, first motor 26 may be a linear hydraulic motor or hydraulic cylinder. First motor 26 may include a sump 126 (shown in FIG. 3) for collecting fluid that may leak from motor 26. Pumps 22, 24, and 25 may be connected to draw fluid from sump 126.

First motor 26 may convert the pressurized fluid from first hydraulic pump 22 into rotational output of a first output shaft 27, which may include an internal spline. First motor 26 may be in fluid communication with first hydraulic pump 22 to receive high pressure fluid from and return low pressure fluid to first hydraulic pump 22. First motor 26 may include multiple piston bores 88, and pistons 90 held against a fixed swashplate 92 (also known as a cradle). One piston 90 may be slidably disposed within each of the bores 88. The swashplate 92 may have a driven surface 92a, and each piston 90 may be biased into engagement with the driven surface 92a. A joint 96, such as, for example, a ball and socket joint, may be disposed between each piston 90 and swashplate 92 to allow for relative movement between swashplate 92 and each piston 90.

Pressurized fluid may be allowed to enter piston bores 88. The pressurized fluid within piston bores 88 may act on pistons 90 to force the pistons 90 to move toward the angled driven surface 92a, thereby converting the linear motion of the pressurized fluid into a torque output of shaft 27. Output shaft 27 may include a bore 271 having axially aligned ridges 272 to mesh with and transmit the rotational output to a drive axle (not shown). The drive axle may be slidably disposed within first output shaft 27 and include axially aligned ridges (not shown) to engage first output shaft 27 and receive rotational output from first motor 26.

Second motor 28 may be substantially similar to first motor 26, but fluidly coupled to second hydraulic pump 24. Second motor 28 may include a driving rotational axis 281 (output) and a driven rotational axis 282 (input) angled relative to the driving rotational axis 281 by an angle of, for example, $\theta_2$. Second motor 28 may receive pressurized fluid from second hydraulic pump 24 and convert the pressurized fluid into rotational output along a second output shaft 29 in a substantially similar manner as first motor 26. Second output shaft 29 may include a bore 291 having axially aligned ridges 292 to mesh with and transmit the rotational output to a second drive axle (not shown). The second drive axle may be slidably disposed within second output shaft 29 and include axially aligned ridges (not shown) to engage second output shaft 29 and receive rotational output from second motor 28. Sump 126 (shown in FIG. 3) may also be connected to collect fluid that may leak from motor 28.

Driveshaft assembly 30 may, in one embodiment, include a first shaft 31 associated with first hydraulic pump 22, and a second shaft 33 associated with second hydraulic pump 24. In this embodiment, first shaft 31 of first hydraulic pump 22 and second shaft 33 of second hydraulic pump 24 may each extend substantially halfway through the distance between first and second hydraulic pumps 22 and 24. First shaft 31 and second shaft 33 may be coupled end-to-end by way of a coupling means 35, such as a sleeve. In an alternative embodiment, drive shaft assembly 30 may include a single integral shaft extending through both of pumps 22 and 24.

Driveshaft assembly 30 may extend completely through both of the first and second hydraulic pumps 22 and 24 to further drive charge pump 25. Charge pump 25 may be a fixed displacement gear pump and may be mounted to second hydraulic pump 24 and driven to supply makeup fluid to first and second hydraulic pumps 22 and 24, as will be described below with reference to FIG. 3. Alternatively, it is contemplated that charge pump 25 may be a variable displacement piston or impeller-type pump. Charge pump 25 may communicate makeup fluid to the first and second hydraulic pumps 22 and 24 through a filter 70. Filter 70 may remove contaminants from the fluid being supplied to first and second hydraulic pumps 22 and 24.

Housing 20 may mechanically and fluidly support each of pumps 22 and 24 and motors 26 and 28. Housing 20 may include a common center section 32 to enable fluid connections between first hydraulic pump 22, second hydraulic pump 24, first motor 26, second motor 28, and any other component of transmission 14. Housing 20, by completing the fluid connections needed to operate transmission 14, may significantly reduce the need for hoses and fittings, thereby greatly reducing the opportunity for contamination or leaks. Further, housing 20 may reduce assembly time required for transmission 14 by reducing or eliminating the need to individually connect and fit each fluid port of transmission 14. Housing 20 may also form a dry sump (not shown) to collect excess fluid. Filter 70 may be mounted to housing 20.

Figure 3:
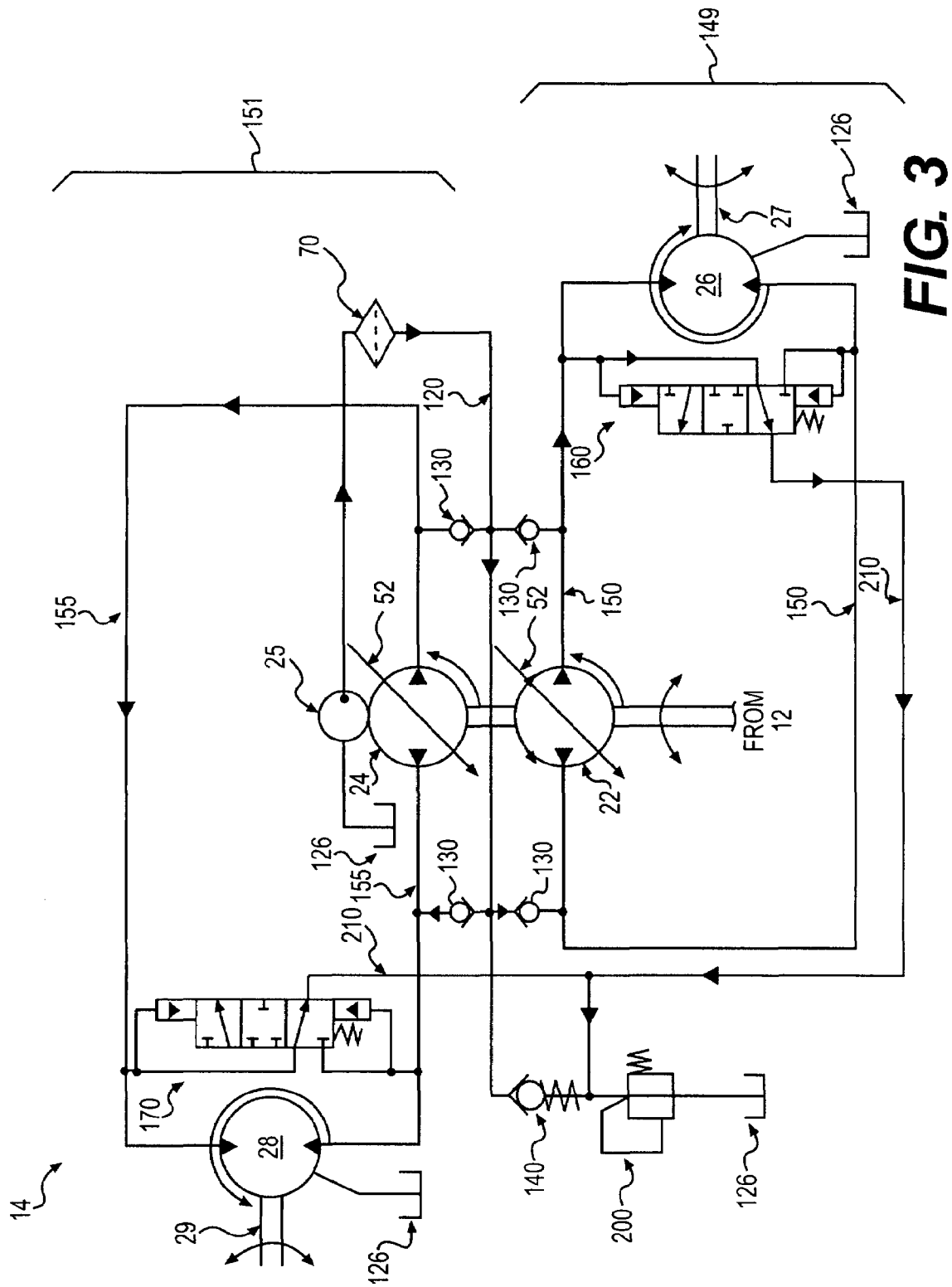
FIG. 3 is a schematic illustration of the transmission of FIG. 2.

A schematic illustration of transmission 14 is provided in FIG. 3. Transmission 14 may include a first closed loop 149 and a second closed loop 151. First closed loop 149 may fluidly connect first hydraulic pump 22 with first motor 26. Second closed loop 151 may fluidly connect second hydraulic pump 24 with second motor 28. Both first hydraulic pump 22 and second hydraulic pump 24 may be over-center type pumps, capable of pressurizing fluid in two directions such that the respective motors may be driven in two directions without complicated and expensive valving. Therefore, pumps 22 and 24 may pressurize fluid in either direction (e.g. clockwise or counterclockwise in FIG. 3) of closed loops 149 and 151, respectively. By generating flow in a clockwise direction within loops 149 and 151, pumps 22 and 24 may cause motors 26 and 28 to rotate in a first direction. By reversing the flow direction in loops 149 and 151, pumps 22 and 24 may cause motors 26 and 28 to rotate in a second and opposite direction. By controlling the direction of rotation of motors 26 and 28, pumps 22 and 24 may effectively control the direction of movement of machine 10.

During the operation of transmission 14, fluid may leak from pumps 22 and 24, passages 150 and 155, motors 26 and 28, and from other parts of transmission 14. The leaking fluid may be collected in sump 126 of common section 32. As fluid leaks from transmission 14, charge pump 25 may replenish transmission 14 with a corresponding amount of replacement (or makeup) fluid. Charge pump 25 may supply makeup fluid to first and second loops 149 and 151 through a passage 120. Fluid supplied by charge pump 25 via passage 120 may first pass through filter 70 to remove any contaminants from the fluid.

Passage 120 may fluidly connect charge pump 25 to first and second closed loops 149 and 151 via a plurality of check valves 130. Check valves 130 may be arranged in parallel with each other, as shown in FIG. 3. Check valves 130 may be paired as shown in FIG. 3, with one pair of check valves 130 fluidly connected to closed loop 149 and a second pair of check valves 130 fluidly connected to closed loop 151. Depending on which direction each of pumps 22 and 24 is working, one of each pairing of check valves 130 may always be located on a low pressure (i.e. suction) side of each of pumps 22 and 24. Check valve 130 may be any type of check valve known in the art including, for example, a ball check valve. Check valve 130 may help prevent fluid from flowing back into passage 120 and only allow makeup fluid to pass into the respective loops 149 and 151 when a pressure therein is sufficiently low.

Passage 120 may also fluidly connect charge pump 25 to a neutral bypass valve 140. Neutral bypass valve 140 may be, for example, a spring loaded check valve, and may ensure a unidirectional flow of fluid to charge relief valve 200. Neutral bypass valve 140 may be located in parallel with check valves 130, as shown in FIG. 3. However, the fluid pressure required to open neutral bypass valve 140 may be a higher pressure than required to open each of check valves 130.

First closed loop 149 may include a pair of supply/return passages 150 (supply and return being based on the pumping direction) that fluidly connect first hydraulic pump 22 with first motor 26. Second closed loop 151 may also include a pair of supply/return passages 155 that fluidly connect second hydraulic pump 24 with second motor 28. A flushing valve 160, 170 may be associated with each loop 149 and 151, respectively. Flushing valves 160 and 170 may be spring-centered shuttle valves, capable of switching between positions open for flow and a position closed to flow. Flushing valves 160 and 170 may have two different positions open for flow (e.g. "up" or "down" as shown in FIG. 3), each position creating a different flow path for fluid. Flushing valves 160 and 170 may be pilot-operated, allowing for a higher pressure side of loops 149 and 151 to pass fluid through valves 160 and 170. The sides of loops 149 and 151 that are high pressure may depend on the direction in which pumps 22 and 24 are working, as described above. When transmission 14 is in neutral, flushing valves 160 and 170 may be closed to inhibit the flow of fluid therethrough.

A charge relief valve 200 may be fluidly connected downstream of neutral bypass valve 140 and flushing valves 160 and 170. Charge relief valve 200 may be any suitable valve arrangement known in the art, such as a spring-loaded spool that cooperates with a cylinder housing. Charge relief valve 200 may serve to temporarily remove or "flush" hot fluid from first and second closed loops 149 and 151 into sump 126, thereby cooling the fluid. First pump 22 may pump fluid out of closed loop 149 and through charge relief valve 200, via flushing valve 160. Second pump 24 may pump fluid out of closed loop 151 and through charge relief valve 200, via flushing valve 170. Passages 210 may fluidly connect flushing valves 160 and 170 to charge relief valve 200. As pumps 22 and 24 force fluid out of closed loops 149 and 151 and through charge relief valve 200, charge pump 25 may direct a corresponding amount of makeup fluid into closed loops 149 and 151. Sump 126 may be fluidly connected to pumps 22, 24, and 25 so that those pumps may draw fluid from sump 126.

INDUSTRIAL APPLICABILITY

The disclosed flushing system may provide a cost effective method for reducing hot spots in closed hydrostatic loops of small vehicles such as skidsteer loaders. The flushing system may provide for full charge flushing of a closed hydrostatic loop through a single charge relief valve. Using only a single charge relief valve may result in significant cost savings while providing adequate cooling. The operation of transmission 14 will now be explained.

Transmission 14 may operate in a non-neutral (i.e. driving) condition and in a neutral condition. The operation of transmission 14 in a non-neutral condition will be described first. First hydraulic pump 22 and second hydraulic pump 24 may pressurize flow in either direction within loops 149 and 151, respectively (e.g. clockwise or counterclockwise, as shown in FIG. 3), depending on the direction in which machine 10 should move. When pumping in a given direction, one side (i.e., the supply side) of each of loops 149 and 151 may have a higher pressure than the other side (i.e., the return side) of each loop. Because they may be pilot-operated, the movement of flushing valves 160 and 170 may be controlled by the high pressure sides of loops 149 and 151, respectively. The flow from the higher pressure side of loops 149 and 151 may be pushed by pumps 22, 24 through flushing valves 160 and 170 and into passages 210. The flow may then flush out of transmission 14 through charge relief valve 200, if the pressure is significantly high. If the direction of pump 22 or 24 is reversed, the opposite side of loops 149 and 151 may become the high pressure side (not shown).

Charge pump 25 may operate to pressurize makeup fluid in passage 120. Because the pressure required by charge pump 25 to open check valves 130 may be less than the pressure required to open neutral bypass valve 140, the pressure in passage 120 will first reach the pressure required to open check valves 130 before opening neutral bypass valve 140, thereby forcing check valves 130 open. Charge pump 25 may force makeup fluid through check valves 130 and into passages 150 and 155 until the pressure within loops 149 and 151 increases above the opening pressure of neutral bypass valve 140 and/or the difference in pressure across check valve 130 drops below a spring bias of check valve 130. This makeup fluid from charge pump 25 may help keep closed loops 149 and 151 fully pressurized by supplementing flow from first hydraulic pump 22 and second hydraulic pump 24.

Transmission 14 may also operate in a neutral condition. When transmission 14 is in a neutral condition, first hydraulic pump 22 and second hydraulic pump 24 may be pressurizing and/or discharging insignificant amounts of fluid. Because of the low pressures in closed loops 149 and 151, flushing valves 160 and 170 may be in a position closed to flow, so that substantially no flow from loops 149 and 151 passes through flushing valves 160 and 170 and into passages 210. Charge pump 25 may operate to pressurize fluid in passage 120. Because the pressure required to open check valves 130 may be less than the pressure required to open neutral bypass valve 140, the pressure in passage 120 may first reach the pressure required to open check valves 130, forcing check valves 130 open. Neutral bypass valve 140 may initially remain closed.

Charge pump 25 may push makeup flow through check valves 130, pressurizing passages 150 and passages 155. Since flushing valves 160 and 170 may be closed, though, flow therethrough may be stopped. Since flow may not be able to pass through flushing valves 160 and 170, pressure in passages 120, 150, and 155 may increase. The pressure in passage 120 may increase until reaching the pressure required to open neutral bypass valve 140. Neutral bypass valve 140 may open, and the full flow of charge pump 25 may pass through neutral bypass valve 140 and charge relief valve 200 into sump 126.

Because the disclosed flushing system of transmission 14 may provide full charge flushing, temperatures within transmission 14 remain substantially constant and balanced, thereby providing for an extended life of transmission 14. Since transmission 14 provides full charge flushing through a single charge relief valve 200, manufacturers may save significant production costs.

It will be apparent to those skilled in the art that various modifications and variations can be made to the disclosed flushing system. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A flushing system for a transmission, comprising:
   a first pump;
   a first motor connected to the first pump to form a first loop;
   a second pump;
   a second motor connected to the second pump to form a second loop;
   a charge pump configured to replenish the first and second loops;
   a neutral bypass valve configured to receive fluid from the charge pump; and
   a charge relief valve situated to receive fluid from the first loop, the second loop, and the neutral bypass valve.

2. The flushing system of claim 1, further including a first flushing valve fluidly connected to the first loop and a second flushing valve fluidly connected to the second loop, the first and second flushing valves being in fluid communication with the charge relief valve.

3. The flushing system of claim 2, wherein the first and second flushing valves are pilot-operated.

4. The flushing system of claim 3, wherein the first loop includes two passages connecting the first pump with the first flushing valve and the first motor and a higher pressure of the two passages controls the motion of the first flushing valve.

5. The flushing system of claim 1, further including a plurality of check valves fluidly connecting the charge pump to the first and second loops.

6. The flushing system of claim 5, wherein the plurality of check valves includes a first plurality of check valves connecting the charge pump to the first loop, and a second plurality of check valves connecting the charge pump to the second loop.

7. The flushing system of claim 6, wherein:
   the first and second pumps are over-center pumps; and
   the first plurality of check valves includes at least one check valve always in fluid communication with a low pressure side of the first pump.

8. The flushing system of claim 1, further including a common sump fluidly connected to the first pump, the second pump, and the charge pump.

9. The flushing system of claim 1, wherein, when in a neutral state, fluid from only the charge pump passes through the charge relief valve.

10. The flushing system of claim 1, wherein, the neutral bypass valve is a spring loaded check valve.

11. A vehicle, comprising:
    a power source; and
    a transmission powered by the power source to propel the vehicle, the transmission comprising:
    a first over-center pump;
    a first motor connected to the first over-center pump to form a first closed loop;
    a second over-center pump;
    a second motor connected to the second over-center pump to form a second closed loop;
    a charge pump configured to replenish the first and second closed loops;
    a neutral bypass valve configured to receive fluid from the charge pump; and
    a single charge relief valve situated to receive fluid from the first over-center pump, the second over-center pump, and the neutral bypass valve.

12. The vehicle of claim 11, further including a first flushing valve fluidly connected to the first loop and a second flushing valve fluidly connected to the second loop, the first and second flushing valves being in fluid communication with the charge relief valve.

13. The vehicle of claim 12, wherein the first and second flushing valves are pilot-operated.

14. The vehicle of claim 11, wherein, the neutral bypass valve is a spring loaded check valve.

* * * * *